(12) United States Patent
Yu

(10) Patent No.: US 8,198,771 B2
(45) Date of Patent: Jun. 12, 2012

(54) MOTOR AND DRIVING DEVICE FOR RECORDING DISK

(75) Inventor: Chang Jo Yu, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 286 days.

(21) Appl. No.: 12/591,217

(22) Filed: Nov. 12, 2009

(65) Prior Publication Data

US 2011/0031833 A1 Feb. 10, 2011

(30) Foreign Application Priority Data

Aug. 6, 2009 (KR) .................. 10-2009-0072410

(51) Int. Cl.
*H02K 5/16* (2006.01)
*H02K 7/08* (2006.01)

(52) U.S. Cl. ........... 310/90; 310/89; 310/90.5; 384/100; 384/124

(58) Field of Classification Search ............ 310/90, 310/89, 90.5; 384/100–124; *H02K 5/16, H02K 7/08*
See application file for complete search history.

(56) References Cited

U.S. PATENT DOCUMENTS

| | | | | |
|---|---|---|---|---|
| 5,715,116 A * | 2/1998 | Moritan et al. | ............ | 360/99.08 |
| 5,822,846 A * | 10/1998 | Moritan et al. | ................ | 29/598 |
| 7,059,773 B2 * | 6/2006 | Hafen et al. | ................ | 384/119 |
| 7,525,227 B2 * | 4/2009 | Tsuchiya et al. | ................ | 310/90 |
| 2005/0074191 A1 * | 4/2005 | Braun et al. | ................ | 384/100 |
| 2005/0084189 A1 * | 4/2005 | Oelsch | ................ | 384/107 |
| 2006/0039635 A1 * | 2/2006 | Schmid | ................ | 384/100 |
| 2006/0097592 A1 * | 5/2006 | Sumi | ................ | 310/90 |
| 2006/0284504 A1 * | 12/2006 | Aiello et al. | ................ | 310/90 |
| 2008/0095480 A1 * | 4/2008 | Obara et al. | ................ | 384/112 |
| 2008/0218019 A1 * | 9/2008 | Sumi | ................ | 310/90 |
| 2010/0033870 A1 * | 2/2010 | Sekii et al. | ................ | 360/99.08 |
| 2011/0031833 A1 * | 2/2011 | Yu | ................ | 310/90 |

FOREIGN PATENT DOCUMENTS

JP 2005-155912 6/2005
JP 2008-306916 12/2008

* cited by examiner

*Primary Examiner* — John K Kim

(57) ABSTRACT

A motor includes a sleeve supporting a shaft such that an upper end of the shaft protrudes upwardly along an axial direction, a sleeve housing in which an outer diameter portion of the sleeve is inserted and supported, an oil sealing cap covering the sleeve at an opposite side of the sleeve housing, and having a sealing protrusion protruding from a top surface thereof to form a capillary seal of oil between the shaft and the sleeve, and a hub base pressure-fitted and fixed on the upper end of the shaft, and having a hub-base outer diameter portion facing the sealing protrusion and forming a first oil sealing part with the sealing protrusion.

11 Claims, 5 Drawing Sheets

MOTOR AND DRIVING DEVICE FOR RECORDING DISK

CROSS-REFERENCE TO RELATED APPLICATIONS

This application claims the priority of Korean Patent Application No. 10-2009-0072410 filed on Aug. 6, 2009, in the Korean Intellectual Property Office, the disclosure of which is incorporated herein by reference.

BACKGROUND OF THE INVENTION

1. Field of the Invention

The present invention relates to a motor and a driving device for a recording disk, and more particularly, to a motor, which is capable of preventing the overflow of oil within a fluid dynamic bearing while maintaining a pull-out force between a shaft and a hub of a rotor, and a driving device for a recording disk.

2. Description of the Related Art

A small spindle motor used in a driving device for a recording disk is a mechanism that employs a fluid dynamic bearing assembly having a shaft supported by fluid pressure generated by oil interposed between the shaft and a sleeve thereof.

The recent improvement in the performance of driving devices for recording disks has increased the demand for low current, low non-repeatable runout (NNRO), impact resistance, vibration resistance or the like.

In addition, research into oil sealing is actively ongoing in order to prevent oil from flowing over a fluid dynamic bearing assembly when a shaft rotates at a high speed.

Meanwhile, in the fluid dynamic bearing assembly, a shaft hole inside a sleeve into which the shaft is inserted has a tapered upper or lower end to thereby achieve the taper sealing of oil.

However, such taper sealing shortens the bearing span of the shaft, which makes it difficult for the shaft to stably support a rotor.

Of late, a sintered sleeve, capable of containing a large amount of oil, has been used. This causes a significant variation in an oil interface due to the thermal expansion of oil. To prevent an oil overflow, the tapered portion may be elongated. However, this makes it more difficult to support the rotor.

SUMMARY OF THE INVENTION

An aspect of the present invention provides a motor and a driving device for a recording disk, which allows a shaft to stably support a rotor by elongating the bearing span of a shaft and prevents an oil overflow by enlarging the oil capacity.

According to an aspect of the present invention, there is provided a motor including: a sleeve supporting a shaft such that an upper end of the shaft protrudes upwardly along an axial direction; a sleeve housing in which an outer diameter portion of the sleeve is inserted and supported; an oil sealing cap covering the sleeve at an opposite side of the sleeve housing, and having a sealing protrusion protruding from a top surface thereof to form a capillary seal of oil between the shaft and the sleeve; and a hub base pressure-fitted and fixed on the upper end of the shaft, and having a hub-base outer diameter portion facing the sealing protrusion and forming a first oil sealing part with the sealing protrusion.

The hub-base outer diameter portion may be formed by depressing the hub base.

The oil between the shaft and the sleeve may be associated through an outer diameter portion of the sleeve, and be sealed by a second oil sealing part formed by an outer surface of the oil sealing cap facing an outer diameter direction and contacting the outer diameter portion of the sleeve, and an inner surface of the sleeve housing forming a fine gap with the outer surface of the oil sealing cap along the outer diameter direction.

The sleeve housing may include a vertical portion to pressure-fit the oil sealing cap into the sleeve housing.

The sleeve housing may be expanded upwardly along the axial direction.

The oil between the shaft and the sleeve may be associated through an outer surface of the sleeve housing contacting the outer diameter portion of the sleeve, and be sealed by a second oil sealing part formed by an outer surface of the sleeve housing facing an outer diameter direction, and an inner surface of the oil sealing cap forming a fine gap with the outer surface in the outer diameter direction.

The oil sealing cap may include a vertical portion to pressure-fit the sleeve housing into the oil sealing cap.

The oil sealing cap may be expanded downwardly along the axial direction.

The sealing protrusion may be inclined along an outer diameter direction.

The motor may further include a thrust plate provided on or under the sleeve.

According to another aspect of the present invention, there is provided a driving device for a recording disk, including: a motor of claim 1, the motor rotating a recording disk; a head transfer unit transferring a head to the recording disk, the head detecting information stored in the recording disk mounted on the motor; and a housing receiving the motor and the head transfer unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
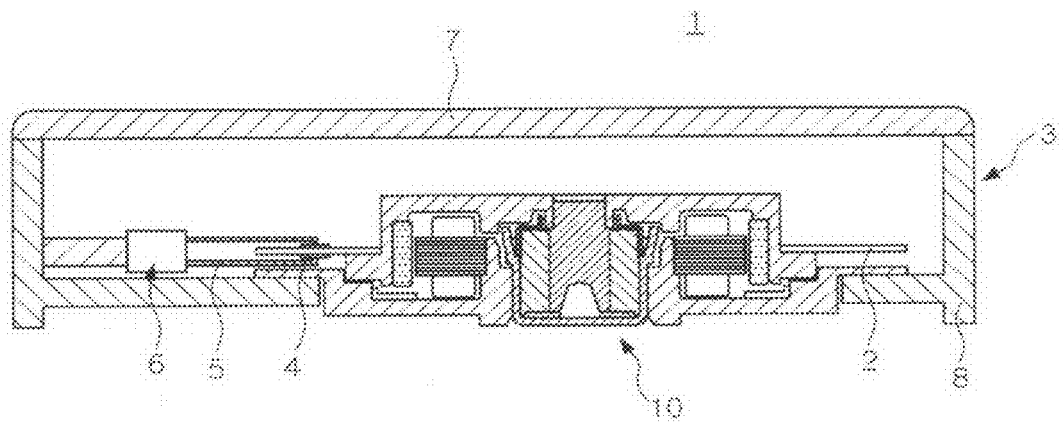
FIG. 1 is a perspective view schematically showing a driving device for a recording disk, which employs a motor according to an exemplary embodiment of the present invention.

Exemplary embodiments of the present invention will now be described in detail with reference to the accompanying drawings. The invention may, however, be embodied in many different forms and should not be construed as limited to the embodiments set forth herein. While those skilled in the art could readily devise many other varied embodiments that incorporate the teachings of the present invention through the addition, modification or deletion of elements, such embodiments may fall within the scope of the present invention.

Like reference numerals in the drawings denote like elements, and thus their description will be omitted.

FIG. 1 is a schematic perspective view showing a driving device for a recording disk, which employs a motor according to an exemplary embodiment of the present invention.

Referring to FIG. 1, a driving device 1 for a recording disk, according to this embodiment, is a hard disk driver, and includes a motor 10, a head transfer unit 6 and a housing 3.

The motor 10 has all the characteristics of a motor, which will now be described according to embodiments of the present invention. The motor 10 is loaded with a recording disk 2.

The head transfer unit 6 transfers a head 4, detecting information stored in the recording disk mounted on the motor 10, toward the side of the recording disk 2 to be detected. Here, the head 4 is disposed on a support 5 of the head transfer unit 6.

The housing 3 may include a motor mounting plate 8 and a top cover 7 shielding the top portion of the motor mounting plate 8 in order to form an interior space accommodating the motor 10 and the head transfer unit 6.

Hereinafter, the motor 10 used for the driving device 1 for a recording disk will be described in detail.

Figure 2:
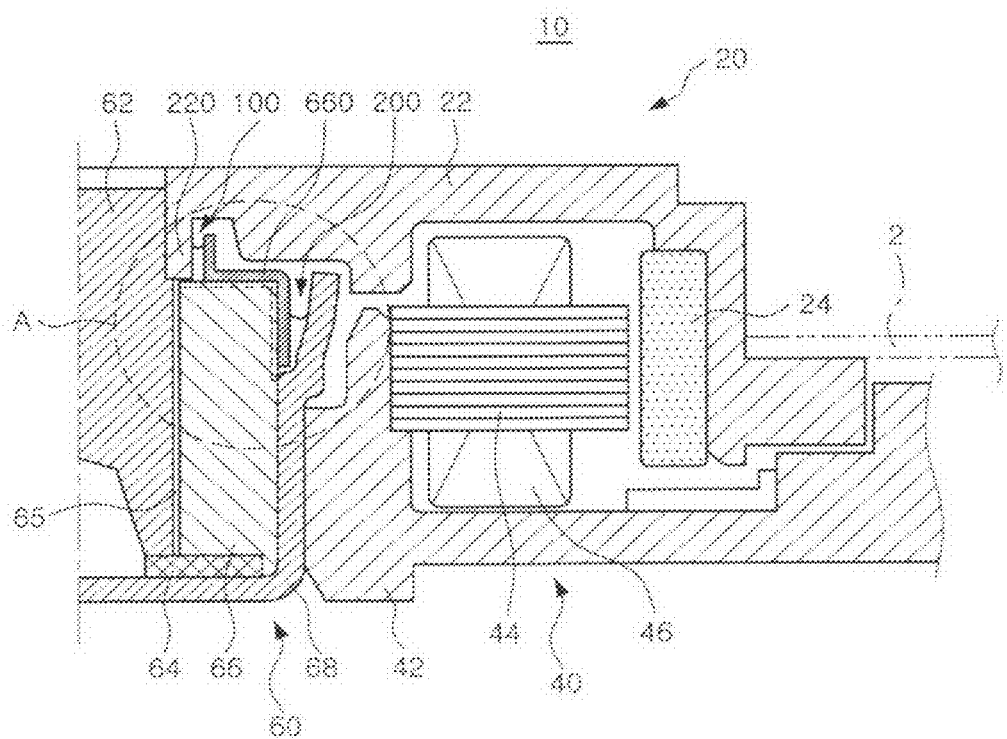
FIG. 2 is a schematic cross-sectional view schematically showing a motor according to an exemplary embodiment of the present invention.
Figure 3:
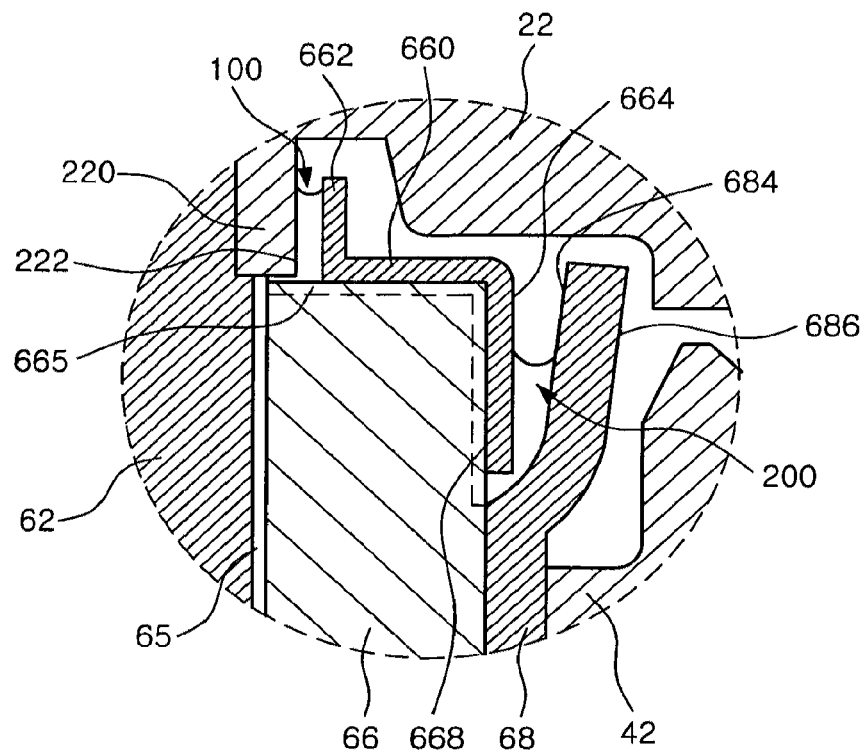
FIG. 3 is an enlarged cross-sectional view schematically showing one embodiment of part A of FIG. 2.

FIG. 2 is a schematic cross-sectional view showing a motor according to an exemplary embodiment of the present invention, and FIG. 3 is an enlarged cross-sectional view schematically showing one embodiment of part A of FIG. 2.

Referring to FIGS. 2 and 3, the motor 10, according to this embodiment, may include a sleeve 66, a sleeve housing 68, an oil sealing cap 660 and a hub base 220.

The motor 10, according to this embodiment, is configured as a fluid dynamic motor 10, and includes a rotor 20, a stator 40 and a bearing assembly 60.

The rotor 20 includes a cup-shaped hub 22 having an annular magnet 24 at its outer circumferential portion corresponding to a coil 46 of the stator 40. The magnet 24 is a permanent magnet magnetized such that N poles and S poles are alternated in a circumferential direction, thereby generating a magnetic force with a predetermined intensity.

The stator 40 includes a support 42 allowing the outer diameter portion of the sleeve housing 68 to be inserted therein, a plurality of cores 44 fixed to the support 42, and a coil 46 winding around the cores 44.

The electromagnetic interaction between the coil 46 and the magnet rotates the rotor 20.

The bearing assembly 60, disposed at the inner side of the support 42 of the stator 40, includes a shaft 62 supporting the rotation of the rotor 20, the sleeve 66 in which the shaft 62 is inserted and supported such that the upper end of the shaft 62 protrudes upwardly in an axial direction, and the sleeve housing 68 in which the outer diameter portion of the sleeve 66 is inserted and supported.

Here, the shaft 62 has a fine gap with a shaft hole 65 of the sleeve 66, and the fine gap is filled with oil. Thus, the shaft 62 can support the rotation of the rotor 20 more smoothly due to the dynamic pressure generated by a radial dynamic pressure groove formed at the inner diameter portion of the sleeve 66.

The bearing assembly 60 of the embodiment of FIG. 2 has a structure in which a thrust plate 64 is disposed at the lower side of the sleeve 66 with reference to the axial direction. The thrust plate 64 has a thrust dynamic pressure groove that provides thrust dynamic pressure to the shaft 62.

Terms used in this specification with regard to directions will now be defined. The axial direction refers to a vertical direction with reference to the shaft 62, and an outer diameter direction and an inner-diameter direction refer to a direction toward the outer side edge of the rotor 20 with reference to the shaft 62, and a direction toward the central direction of the shaft 62 with reference to the outer side edge of the rotor 20, respectively.

The oil sealing cap 660 covers the top surface and the upper side surface of the sleeve 66 at the opposite side of the sleeve housing 58. The oil sealing cap 660 has a sealing protrusion 662 protruding from its top surface in order to achieve the capillary seal of the oil between the shaft 62 and the sleeve 66.

The hub 22 of the rotor 20 includes a hub base 220 that is pressure-fitted and fixed onto the upper end of the shaft 62. The hub base 220 has a hub-base outer diameter portion 222, which faces the sealing protrusion 662. The sealing protrusion 662 and the hub-base outer diameter portion 222 may seal the oil between the shaft 62 and the sleeve 66 by using the capillary phenomenon, to thereby form a first oil sealing part 100.

The hub-base outer diameter portion 222 may be formed by depressing the hub base upwardly in the axial direction.

In order to elongate the bearing span of the shaft 62, oil may be sealed in a second sealing part 200 disposed at the outer diameter portion 668 of the sleeve 66. In this case, oil between the shaft 62 and the sleeve 66 is associated through an oil channel 665 formed at the outer diameter portion 668 of the sleeve 66 and the top surface of the sleeve 66.

The second oil sealing part 200 is formed by the outer surface 664 of the oil sealing cap 660 facing the outer diameter direction and contacting the outer diameter portion 668 the sleeve 66, and the inner surface 684 of the sleeve housing 68 forming a fine gap with the outer surface 664 of the oil sealing cap 660 along the outer diameter direction.

The sleeve housing 68 has a shape that is expanded (spread) upwardly in the axial direction, thereby achieving the taper sealing of a second oil interface.

Figure 4:
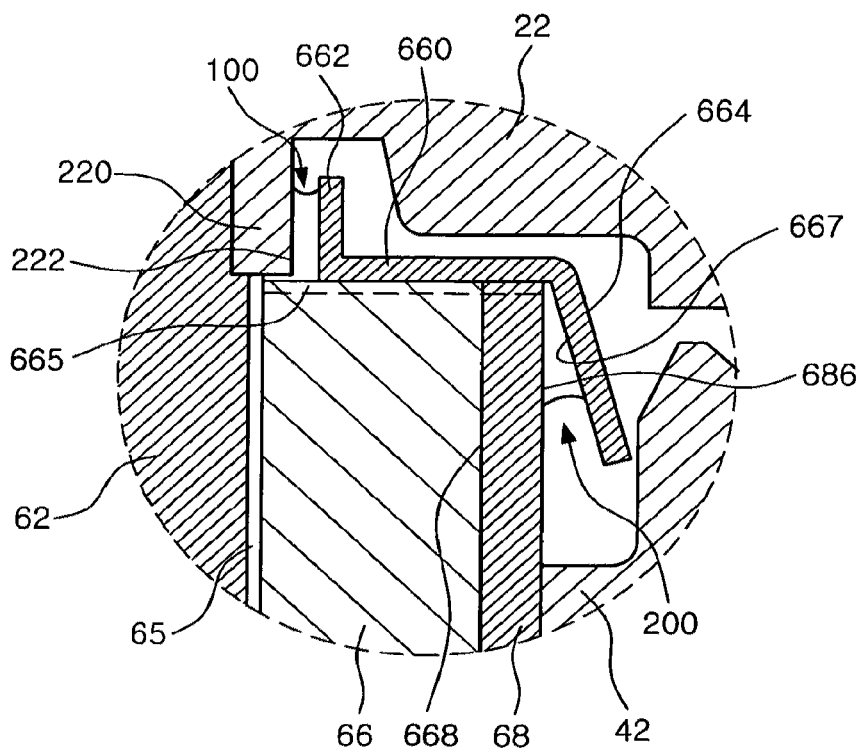
FIG. 4 is an enlarged cross-sectional view schematically showing a modified embodiment of part A of FIG. 2.

FIG. 4 is an enlarged cross-sectional view schematically showing a modified embodiment of part A of FIG. 2.

Referring to FIG. 4, another embodiment of the second oil sealing part 200 is illustrated.

Unlike FIG. 3, oil between the shaft 62 and the sleeve 66 is associated through an oil channel 665 formed at the outer surface 686 of the sleeve housing 68 contacting the outer diameter portion 668 of the sleeve 66, and the respective top surfaces of the sleeve 66 and the sleeve housing 68.

The second oil sealing part 200 is formed by the outer surface 686 of the sleeve housing 68 facing the outer diameter direction, and the inner surface 667 of the oil sealing cap 660 forming a fin gap with the outer surface 686 of the sleeve housing 68 along the outer diameter direction.

The oil sealing cap 660 is expanded (spread) downwardly in the axial direction, thereby achieving the taper sealing of a second oil interface.

Figure 5:
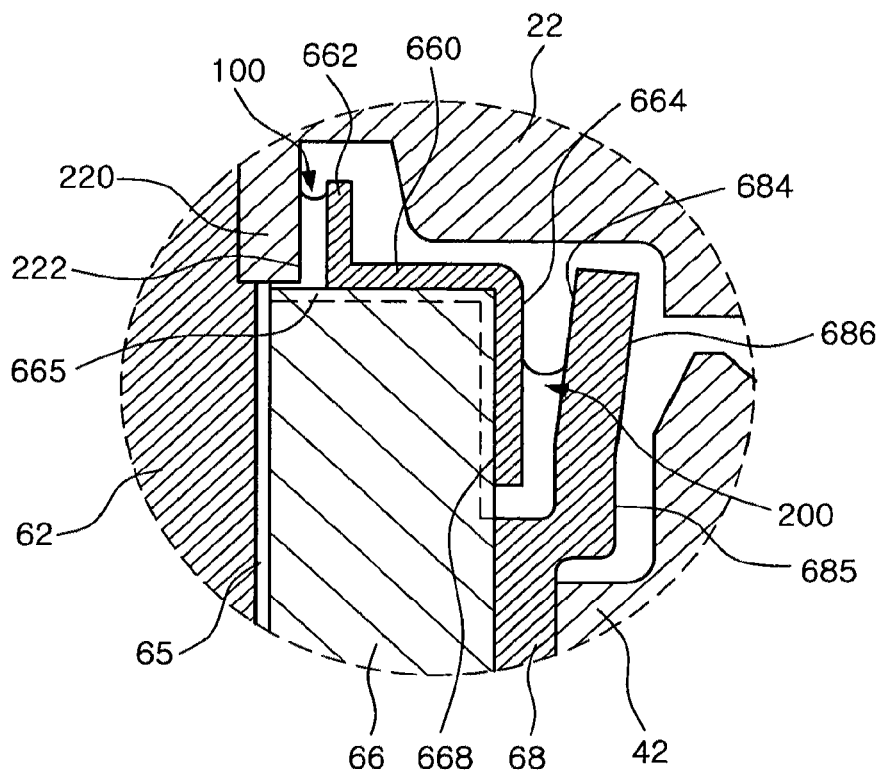
FIG. 5 is an enlarged cross-sectional view schematically showing the fixation of an oil sealing cap depicted in FIG. 3.
Figure 6:
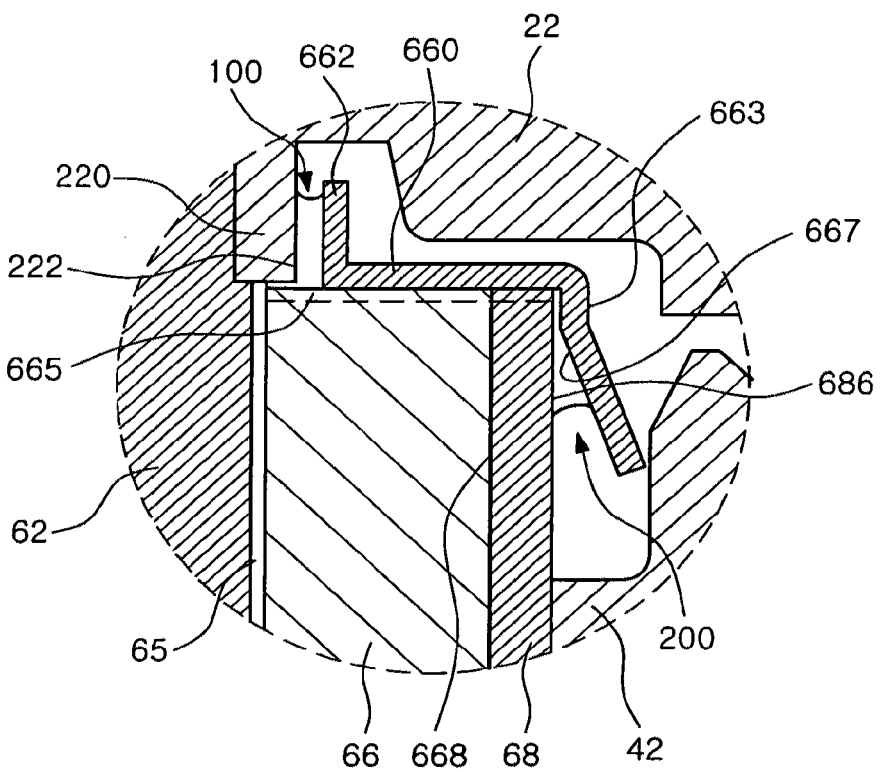
FIG. 6 is an enlarged cross-sectional view schematically showing the fixation of an oil sealing cap depicted in FIG. 4.

FIG. 5 is an enlarged cross-sectional view schematically showing the fixation of the oil sealing cap of FIG. 3, and FIG. 6 is an enlarged cross-sectional view schematically showing the fixation of the oil sealing cap of FIG. 4.

Referring to FIG. 5, according to the embodiment of the second oil sealing part 200 of FIG. 3, the sleeve housing 68 may have a vertical portion 685 by which the outer surface 664 of the oil sealing cap 660 is pressure-fitted in the sleeve housing 68.

Referring to FIG. 6, according to another embodiment of the second oil sealing part 200 of FIG. 4, the oil sealing cap 660 may have a vertical portion 663 by which the sleeve housing 68 is pressure-fitted therein.

These vertical portions 685 and 663 ensure the firm fixation of the oil sealing cap 660 and the sleeve housing 68.

Figure 7:
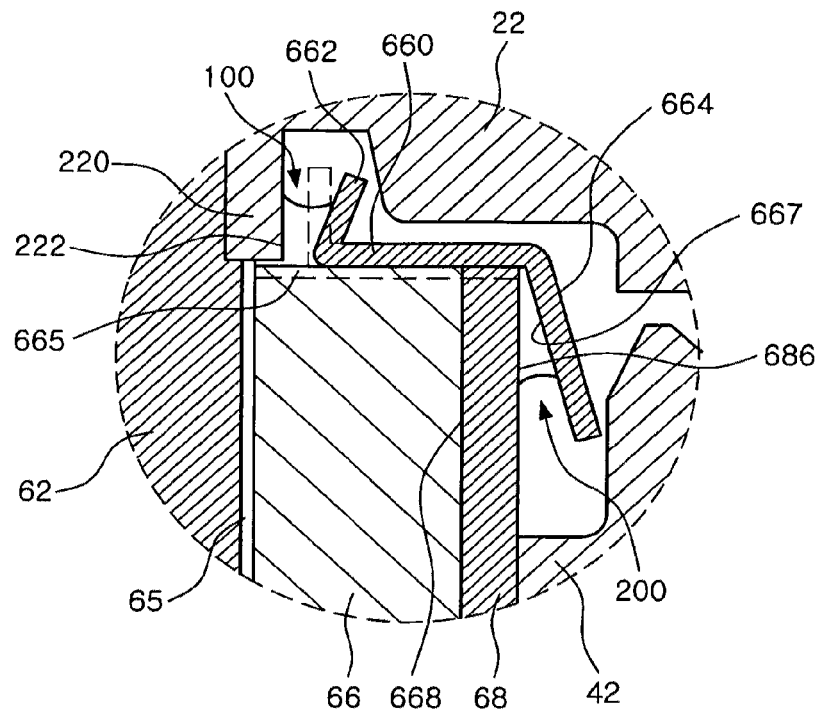
FIG. 7 is a cross-sectional view schematically showing the oil sealing cap having an inclined oil sealing protrusion.

FIG. 7 is a schematic cross-sectional view illustrating the oil sealing cap having an inclined oil sealing protrusion.

Referring to FIG. 7, the sealing protrusion 662 of the first oil sealing part 100 may be inclined in the recess of the hub base 220 along the outer diameter direction.

The sealing protrusion 662 inclined along the outer diameter direction forms a taper sealing with the inner diameter portion of the hub base 220, so that oil can be sealed in a greater amount.

In addition, the taper sealing can seal a large amount of oil and holds the oil firmly due to a capillary phenomenon in which oil is gathered in a narrow space.

Figure 8:
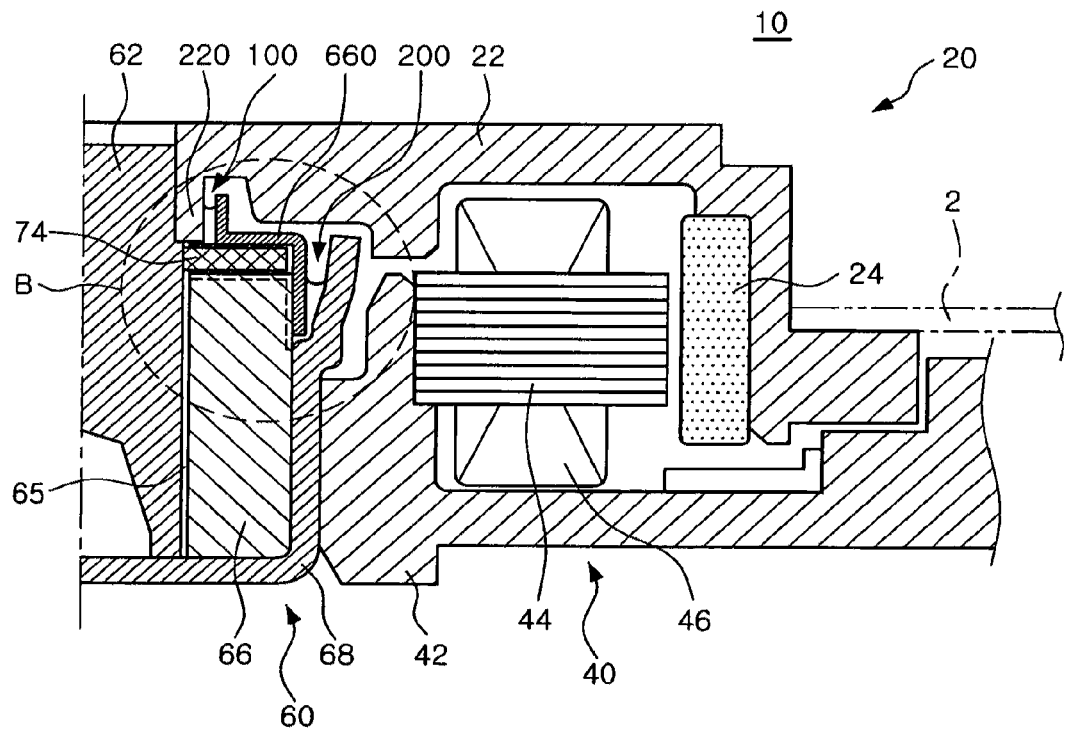
FIG. 8 is a cross-sectional view schematically showing a motor according to another exemplary embodiment of the present invention.
Figure 9:
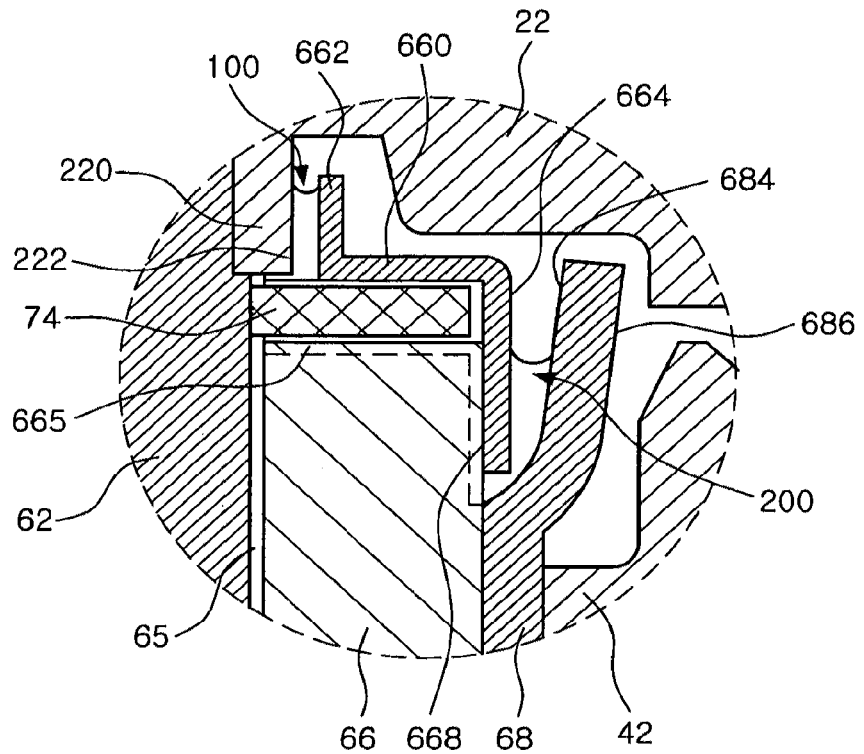
FIG. 9 is an enlarged cross-sectional view schematically showing one embodiment of part B of FIG. 8.

FIG. 8 is a schematic cross-sectional view illustrating a motor according to another exemplary embodiment of the present invention. FIG. 9 is an enlarged cross-sectional view schematically showing one embodiment of part B of FIG. 8, and FIG. 10 is an enlarged cross-sectional view schematically showing a modified embodiment of part B of FIG. 8.

Figure 10:
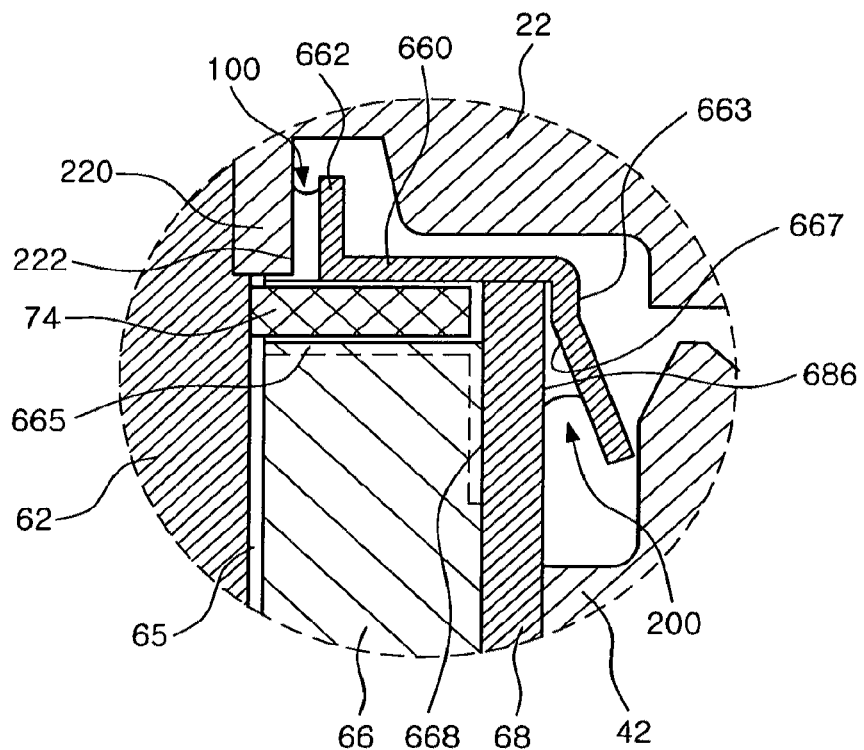
FIG. 10 is an enlarged cross-sectional view schematically showing a modified embodiment of part B of FIG. 8.

Unlike the embodiment depicted in FIGS. 2 through 4, in the embodiment depicted in FIGS. 8 through 10, the thrust plate 74 is provided on the sleeve 66, and the oil sealing cap 660 covers the thrust plate 74 and the side portion of the sleeve 66.

The configurations of the first oil sealing part 100 and the second sealing part 200 are substantially identical to those in the embodiment of FIGS. 2 through 4. Thus, a detailed description thereof is omitted.

The motor and the driving device for a recording disk according to the embodiments of the present invention can maintain the long bearing span of the shaft, so that the shaft can support the rotor stably.

In addition, the first oil sealing part is formed by the outer diameter portion of the hub base and the corresponding oil sealing cap, and the second oil sealing part is formed by the sleeve housing and the corresponding oil sealing cap. This contributes to increasing oil holding capacity, so that the oil leakage out of the sleeve can be reduced.

While the present invention has been shown and described in connection with the exemplary embodiments, it will be apparent to those skilled in the art that modifications and variations can be made without departing from the spirit and scope of the invention as defined by the appended claims.

What is claimed is:

1. A motor comprising:
    a sleeve supporting a shaft such that an upper end of the shaft protrudes upwardly along an axial direction;
    a sleeve housing in which an outer diameter portion of the sleeve is inserted and supported;
    an oil sealing cap covering the sleeve at an opposite side of the sleeve housing, and having a sealing protrusion protruding from a top surface thereof to form a capillary seal of oil between the shaft and the sleeve; and
    a rotor hub pressure-fitted and fixed on the upper end of the shaft, including a hub base extended downwardly in an axial direction, and having a hub-base outer diameter portion facing the sealing protrusion and forming a first oil sealing part with the sealing protrusion,
    wherein the oil between the shaft and the sleeve is associated through an outer diameter portion of the sleeve, and is sealed by a second oil sealing part, and
    wherein the second oil sealing part is formed by an outer surface of the oil sealing cap facing an outer diameter direction and contacting the outer diameter portion of the sleeve, and an inner surface of the sleeve housing forming a fine gap with the outer surface of the oil sealing cap along the outer diameter direction.

2. The motor of claim 1, wherein the hub-base outer diameter portion is formed by depressing the hub base.

3. The motor of claim 1, wherein the sleeve housing is expanded upwardly along the axial direction.

4. The motor of claim 1, wherein the sealing protrusion is inclined along an outer diameter direction.

5. The motor of claim 1, further comprising a thrust plate provided on or under the sleeve.

6. A driving device for a recording disk comprising:
    a motor of claim 1, the motor rotating a recording disk;
    a head transfer unit transferring a head to the recording disk, the head detecting information stored in the recording disk mounted on the motor; and
    a housing receiving the motor and the head transfer unit.

7. A motor, comprising:
    a sleeve supporting a shaft such that an upper end of the shaft protrudes upwardly along an axial direction;
    a sleeve housing in which an outer diameter portion of the sleeve is inserted and supported;
    an oil sealing cap covering the sleeve at an opposite side of the sleeve housing, and having a sealing protrusion protruding from a top surface thereof to form a capillary seal of oil between the shaft and the sleeve; and
    a rotor hub pressure-fitted and fixed on the upper end of the shaft, and comprising a hub base extended downwardly in an axial direction, having a hub-base outer diameter portion facing the sealing protrusion and forming a first oil sealing part with the sealing protrusion,
    wherein the oil between the shaft and the sleeve is associated through an outer surface of the sleeve housing contacting the outer diameter portion of the sleeve, and is sealed by a second oil sealing part, and
    wherein the second oil sealing part is formed by an outer surface of the sleeve housing facing an outer diameter direction, and an inner surface of the oil sealing cap forming a fine gap with the outer surface in the outer diameter direction.

8. The motor of claim 7, wherein the oil sealing cap is expanded downwardly along the axial direction.

9. The motor of claim 7, wherein the sealing protrusion is inclined along an outer diameter direction.

10. The motor of claim 7, further comprising a thrust plate provided on or under the sleeve.

11. A driving device for a recording disk comprising:
    a motor of claim 7, the motor rotating a recording disk;
    a head transfer unit transferring a head to the recording disk, the head detecting information stored in the recording disk mounted on the motor; and
    a housing receiving the motor and the head transfer unit.

* * * * *